H. W. STIMSON.
TOOL.
APPLICATION FILED NOV. 12, 1920.
1,418,847.
Patented June 6, 1922.
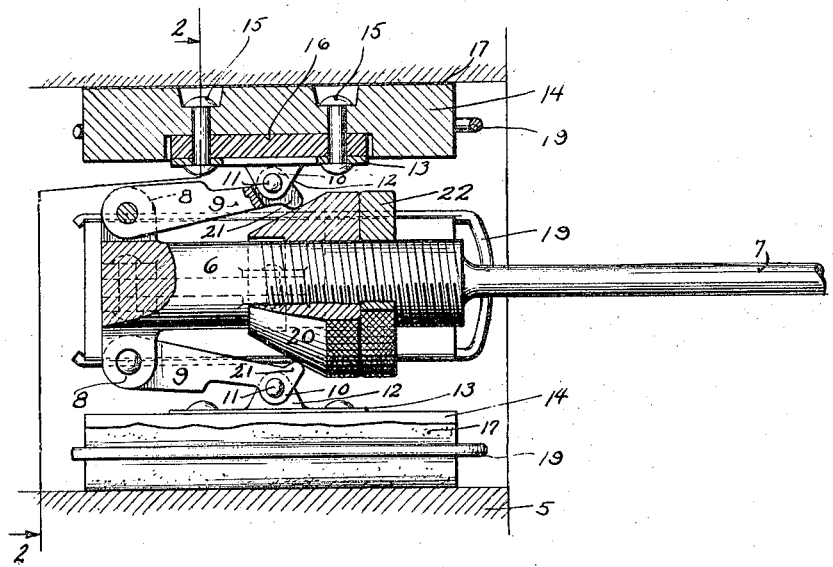
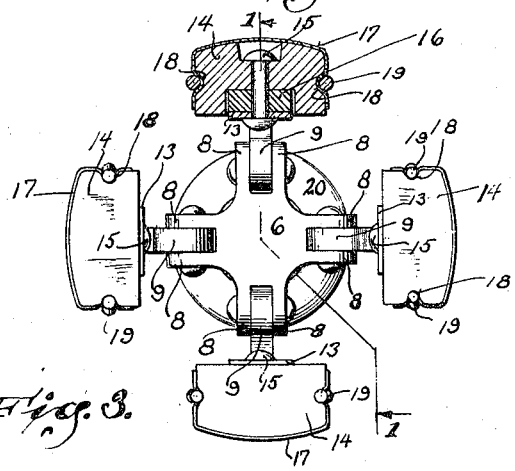
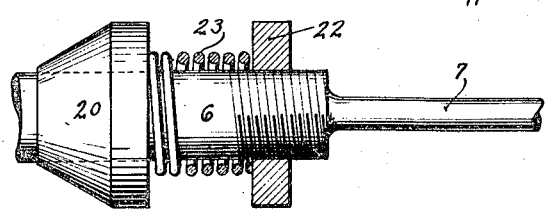
Inventor
Harry W. Stimson.
Morsell & Keeney,
Attorneys

UNITED STATES PATENT OFFICE.

HARRY W. STIMSON, OF WEST ALLIS, WISCONSIN.

TOOL.

1,418,847.   Specification of Letters Patent.   Patented June 6, 1922.

Application filed November 12, 1920. Serial No. 423,616.

*To all whom it may concern:*

Be it known that I, HARRY W. STIMSON, a citizen of the United States, and resident of West Allis, in the county of Milwaukee and State of Wisconsin, have invented new and useful Improvements in Tools, of which the following is a description, reference being had to the accompanying drawings, which are a part of this specification.

This invention relates to certain new and useful improvements in tools, and has for one of its objects to provide a tool especially adapted for use in removing scoring from cylinders, removing the ridges therein after the same have been bored, and for any other purpose desired where the tool will perform its functions in a satisfactory manner.

Another object of this invention is to provide a tool of the class described so designed and constructed as to permit its use immediately after a cylinder has been bored by mounting the same in a chuck carried by the tail piece of the lathe upon which the cylinder is being bored whereby the reaming or polishing of the cylinder will be absolutely true with the bore thereof.

A further object of this invention is to provide a tool of the class described in which the tool member proper or the abrasive carrying member is yieldingly or resiliently connected with the tool arbor.

A still further object of this invention is to provide a tool of the class described having a plurality of tool members having means for simultaneously adjusting the same with respect to the axis of the tool arbor.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention, and a modification thereof, constructed according to the best mode I have so far devised for the practical application of the principles thereof, and in which:

Figure 1 is a side view of a tool embodying my invention illustrating the same as operating within a cylinder shown in conventional lines, said view being part in section and part in elevation, and taken on the plane of the line 1—1 of Figure 2;

Figure 2 is an end view of my improved tool, parts thereof being in section and part in elevation, and said view being taken on the line 2—2 of Figure 1; and Figure 3 is a fragmentary view part in section and part in elevation, of a slightly modified construction of my tool.

Referring now more particularly to the accompanying drawing, in which like numerals designate like parts throughout the several views:

The numeral 5 designates a cylinder, shown in conventional lines in Figure 1, that is being worked upon to remove scoring or to ream the same by my improved tool which consists of an arbor having an enlarged outer end 6 and an inner reduced end 7 which extends throughout the major portion of its length. The part 6 carries the tool parts proper and the part 7 is engageable with a chuck or other holding member, not shown.

The outer end of the part 6 is provided with pairs of radially extending spaced ears or lugs 8 between which are pivotally secured the outer ends of links 9. The inner ends of the links 9 are pivotally secured, as at 11, to the inner projections 12 of fastening plates 13. The fastening plates 13 are each in turn connected with a block or tool member 14 by fastenings 15, suitable yieldable or resilient means 16 being interposed between the fastening plates 13 and the members 14 whereby the members 14 are normally yieldably urged into engagement with the walls of the cylinder 5.

The blocks 14 may be, as before stated, the tool member proper or may form the holding means for a polishing or an abrasive member 17, as illustrated in the drawing. In the event that the members 14 form merely retaining blocks for the covering 17, they have their sides longitudinally channeled as at 18, in which a spring clip or other fastening member 19 is engageable to readily removably secure the covering in position.

The circumference formed by the outer faces of the members 14, may be readily adjusted to accommodate the tool for use in connection with cylinders of any size, and this adjustment is obtained by a cone member 20 mounted upon the part 6. In Figures 1 and 2, the cone member has a centrally threaded bore in engagement with the threads of the part 6 whereby the same may be moved toward or away from the outer end of the arbor. Engageable with the inclined face of the cone member 20 are projections or lugs 21 formed on the links 9 so that a movement of the cone 20 toward the outer end of the arbor will expand the tool or a reverse movement will contract the same. The cone member 20 is readily releasably secured in its adjusted position by a knurled lock nut 22.

In Figure 3 I have illustrated a slightly modified form of my invention in which the yielding engagement of the tool members with the walls of the cylinder being worked upon is obtained by freely slidably mounting the cone member 20 upon the arbor shank 6 and confining a spring 23 between the cone member and the knurled nut 22. The adjustment of the tool is obtained by changing the position of the nut 22 to vary the tension of the spring 23, and by this construction the engagement of the members 14 with the cylinder walls is yieldable. If desired, in this form of my invention, the resilient member 16 may be dispensed with and the securing members 13 made fast with the blocks 14.

What I claim as my invention is:

1. A device of the class described, comprising an arbor, a tool member, a link connecting the tool member with the arbor, said link having a yieldable connection with the tool member, and means for adjusting the tool member with relation to the axis of the arbor.

2. A device of the class described, comprising an arbor, a tool member, a link having one end pivotally connected with the arbor and its other end pivotally connected with the tool member, a part on the end of the link connected with with the tool member, and a cone member adjustably carried by said arbor and engageable with said link part for adjusting the tool member with respect to the arbor.

3. A device of the class described, comprising an arbor, a tool member, a fastening member, yieldable means connecting the fastening member with the tool member, means connecting the fastening member with the arbor, and means for adjusting the tool member with respect to the arbor.

4. A device of the class described, comprising an arbor, a tool member, a fastening member, yieldable means connecting the fastening member with the tool member, a link having one end connected with the arbor and its other end connected with the fastening member, a projection on said link, and a cam device engageable with said projection for adjusting the tool member with respect to the arbor.

5. A device of the class described, comprising an arbor, a plurality of tool members, a link connecting each tool member with the arbor, said links having their outer ends pivotally secured to the arbor and their inner ends pivotally connected with the tool members, inwardly extending parts on said links, and cam means threaded on said arbor and engageable with said link parts to simultaneously adjust the tool members with respect to the axis of the arbor.

In testimony whereof, I affix my signature.

HARRY W. STIMSON.